(12) United States Patent
Thiele et al.

(10) Patent No.: US 10,889,171 B2
(45) Date of Patent: Jan. 12, 2021

(54) VEHICLE DOOR ASSEMBLY WITH WEATHERSTRIP AND METHODS OF USE AND MANUFACTURE THEREOF

(71) Applicant: Honda Motor Co., Ltd., Tokyo (JP)

(72) Inventors: Steven R. Thiele, Marysville, OH (US); Jacob I. Wasser, Delaware, OH (US); James P. Guitar, Prospect, OH (US); Chase A. Reynolds, Marysville, OH (US); Ian Z. O'Keefe, Dublin, OH (US); Sam R. McCrary, Prospect, OH (US); Jordan T. Coiro, Marysville, OH (US); Nigel W. Williams, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 116 days.

(21) Appl. No.: 16/152,745

(22) Filed: Oct. 5, 2018

(65) Prior Publication Data
US 2020/0108703 A1 Apr. 9, 2020

(51) Int. Cl.
*B60J 10/75* (2016.01)
*B60J 10/22* (2016.01)
*B60J 10/32* (2016.01)

(52) U.S. Cl.
CPC .............. *B60J 10/75* (2016.02); *B60J 10/22* (2016.02); *B60J 10/32* (2016.02)

(58) Field of Classification Search
CPC ................................. B60J 5/0411; B60J 10/75
See application file for complete search history.

(56) References Cited

U.S. PATENT DOCUMENTS

| 6,176,003 | B1* | 1/2001 | Aoyama | B60J 10/22 |
| | | | | 29/527.4 |
| 6,401,394 | B2* | 6/2002 | Nozaki | B60J 10/18 |
| | | | | 49/377 |
| 6,446,392 | B1* | 9/2002 | Maki | B60J 10/265 |
| | | | | 49/377 |
| 6,966,601 | B2 | 11/2005 | Matsumoto et al. | |
| 7,536,830 | B2 | 5/2009 | Clark et al. | |
| 8,714,624 | B2* | 5/2014 | Fukui | B60R 13/04 |
| | | | | 296/146.1 |

(Continued)

FOREIGN PATENT DOCUMENTS

| JP | 4924894 B2 | 4/2012 |
| JP | 6287253 B2 | 3/2018 |

(Continued)

*Primary Examiner* — Catherine A Kelly
(74) *Attorney, Agent, or Firm* — Kenealy Vaidya LLP

(57) ABSTRACT

An assembly for use in a vehicle door that can include a weather strip, a door flange, a weatherstrip datum formation, and a flange datum formation. The weatherstrip can include a mounting member that extends along a length axis of the weatherstrip. The mounting member can include a side wall that extends along the length axis. The side wall can include the weatherstrip datum formation. The door flange can be configured to integrate with an inner door panel. The door flange can include a flange datum formation. The weatherstrip datum formation can be engageable with the flange datum formation so as to position the weatherstrip relative to the door flange.

20 Claims, 15 Drawing Sheets

(56) References Cited

U.S. PATENT DOCUMENTS

| | | | | |
|---|---|---|---|---|
| 9,038,318 | B2* | 5/2015 | Jendrossek | B60J 10/2335 49/479.1 |
| 9,067,547 | B2* | 6/2015 | Jun | B60R 13/04 |
| 9,211,781 | B2* | 12/2015 | Saiki | B60R 13/04 |
| 9,656,539 | B2* | 5/2017 | Kuno | B60J 10/75 |
| 10,286,768 | B2* | 5/2019 | Ogawa | B60J 10/75 |
| 2004/0104542 | A1* | 6/2004 | Kobayashi | B60J 10/16 277/640 |
| 2018/0072141 | A1 | 3/2018 | Shimoda | |
| 2019/0061503 | A1* | 2/2019 | Filipczak | B60J 10/75 |

FOREIGN PATENT DOCUMENTS

| | | | | |
|---|---|---|---|---|
| KR | 0138868 | Y1 | 4/1999 | |
| KR | 20070053418 | A | 5/2007 | |
| KR | 100792570 | B1 | 1/2008 | |
| WO | WO-2019192945 | A1* | 10/2019 | B60J 10/75 |

* cited by examiner

VEHICLE DOOR ASSEMBLY WITH WEATHERSTRIP AND METHODS OF USE AND MANUFACTURE THEREOF

BACKGROUND

The disclosed subject matter relates to a vehicle door assembly, and methods of use and manufacture thereof. More particularly, the disclosed subject matter relates to methods and apparatus for attaching a weatherstrip to a vehicle door assembly.

A vehicle can include one or more door assemblies that can permit ingress/egress to/from a vehicle interior or vehicle storage area. Some vehicle door assemblies can include a windowpane or other panel that can be fixed in place or movable between open and closed positions. It is known to use weatherstrips with a windowpane. However, known arrangements have deficiencies.

SUMMARY OF THE INVENTION

Some embodiments are directed to an assembly for use in a vehicle door that can include a weatherstrip, a door flange, a weatherstrip datum formation, and a flange datum formation. The weatherstrip can include a mounting member that extends along a length axis of the weatherstrip. The mounting member can include a side wall that extends along the length axis. The side wall can include the weatherstrip datum formation. The door flange can be configured to integrate with an inner door panel. The door flange can include a flange datum formation. The weatherstrip datum formation can be engageable with the flange datum formation so as to position the weatherstrip relative to the door flange.

Some embodiments are directed to a door assembly for a vehicle. The door assembly can include an outer door panel, an inner door panel connected to the outer door panel, a cavity extending from the inner door panel to the outer door panel, an opening extending from the outer door panel to the inner door panel and in communication with the cavity, a windowpane and a weatherstrip. The inner door panel can include a flange. The flange can include a flange datum formation that has a first shape. The flange can extend along the opening. The windowpane can be housed in the cavity and can be movable between an opened position where the windowpane is retracted through the opening and into the cavity and a closed position where the windowpane is extended through the opening and out of the cavity. The windowpane can include an inner surface that moves into and out of the cavity as the windowpane moves between the opened position and the closed position. The weatherstrip can be connected to the flange of the inner door panel. The weatherstrip can include a mounting member, at least one flange seal and a weatherstrip datum formation. The mounting member can be connected to and extend along the flange of the inner door panel. The at least one flange seal can extend from the mounting member to the surface of the inner surface of the windowpane. The at least one flange seal can engage the inner surface of the windowpane to form a seal between the inner surface of the windowpane and the opening. The weatherstrip datum formation can have a second shape that is complementary to the first shape to the flange datum formation. The weather strip datum formation can engage the flange datum formation such that the weatherstrip datum formation and the flange datum formation together locate the weatherstrip at a predetermined position on the flange.

Some embodiments are directed to an assembly for use in a vehicle door that can include a weatherstrip, a door flange, a weatherstrip datum formation, and a flange datum formation. The weatherstrip can include a mounting member that extends along a length axis of the weatherstrip. The mounting member can include a side wall that extends along the length axis. The side wall can include a weatherstrip datum formation. The door flange can be configured to integrate with an inner door panel. The door flange can include a flange datum formation. The weatherstrip datum formation can be engageable with the flange datum formation so as to position the weatherstrip relative to the door flange. The weatherstrip datum formation can include a tab. The door flange can include a support wall and the flange datum formation can be provided on the support wall. The flange datum formation includes a receiving opening that is configured to receive the tab.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

As discussed in detail below, each of the weatherstrip and the door can include a datum formation that can improve the alignment accuracy of the weatherstrip relative to the door as compared to a weatherstrip that does not incorporate a datum function. The datum formation on either the door or the weatherstrip can provide a unique visual locator for initially locating the weatherstrip relative to the door. Further, a mating relationship between the datum formations of the weatherstrip and the door can permit an accurate final position of the weatherstrip. As a result of the improved location accuracy of the weatherstrip relative to the door, an end or foam plug on either end of the door inner weatherstrip can be accurately located such that the plug compresses against the door panel surface in accordance with a predetermined specification and, as a result of this compression, can provide a seal having a predetermined and predictable performance. In contrast, a weatherstrip and/or a door that lacks a datum formation can permit inaccurate location of the weatherstrip on the door, which, in turn can have an adverse effect on the performance of the seal formed by the plug.

Figure 1:
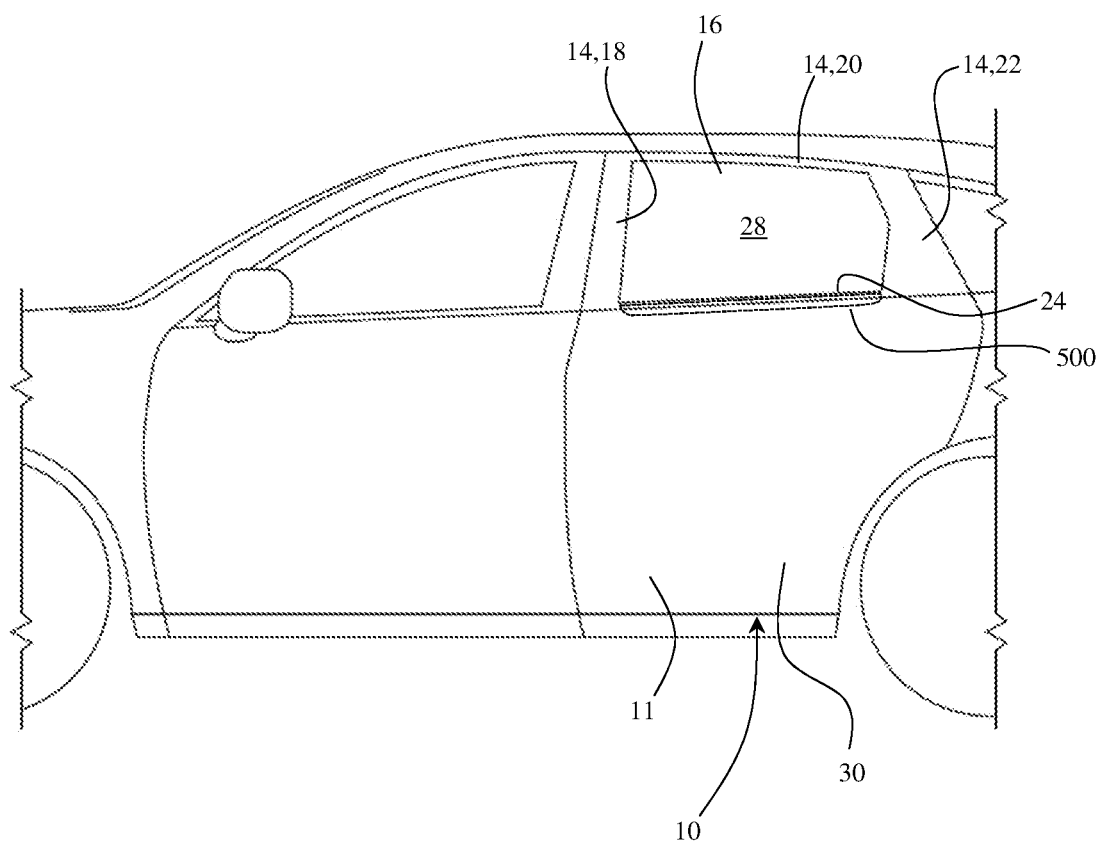
FIG. 1 is a side view of an exterior side of a door for a vehicle, in accordance with one or more embodiments of the disclosure.

FIG. 1 is a side view of an exterior side of a door for a vehicle, in accordance with one or more embodiments of the disclosure. More specifically, FIG. 1 is a side view that illustrates an embodiment of a door assembly 10 for a vehicle made in accordance with the principles of the disclosed subject matter. The door assembly 10 can be configured as a front-hinged door, a rear-hinged door, a sliding door, a top-hinged door, or a bottom-hinged door.

The door assembly 10 can include an outer door panel 30, a door sash 14 and a windowpane 16. The door assembly 10 can include a lower portion 11 and an upper portion, which is positioned above the lower portion. The outer door panel 30 can extend along the lower portion 11 of the door assembly 10. The door sash 14 can extend along the upper portion of the door assembly 10.

The lower portion of the door assembly 10 can include such components as a hinge assembly, a latch assembly for securing the door in a closed portion, inner and outer door handles for releasing the latch assembly and for facilitating movement of the door assembly by a user of the vehicle, a door lock assembly, and a window control or regulator assembly for raising and lowering the windowpane 16. Exemplary embodiments can include more or less of these components, systems and assemblies included with the door assembly 10.

The door sash 14 can include a front portion 18, a top portion 20, and a rear portion 22. The front and rear portions 18, 22 can extend upwardly or away from the lower portion of the door assembly 10. The top portion 20 can extend from the front portion 18 to the rear portion 22. Exemplary embodiments can include an inner and/or an outer door handle mounted on, or to, the sash 14 instead of being mounted to the lower portion of the door assembly 10.

With further reference to FIG. 1, the door sash 14 can cooperate with an upper edge 24, of the outer door panel 31, to provide a frame that surrounds an opening 28 in the door assembly 10, with such opening for the windowpane 16. The sash 14 can be configured to hold the windowpane 16 in a fixed position when the windowpane is closed, for example, or to permit and guide the windowpane 16 with movement between a closed position and an opened position. FIG. 1 also illustrates positioning of an inner weatherstrip 500 of the disclosure, which can be positioned as shown adjacent to a lower edge of opening 28.

Figure 2:
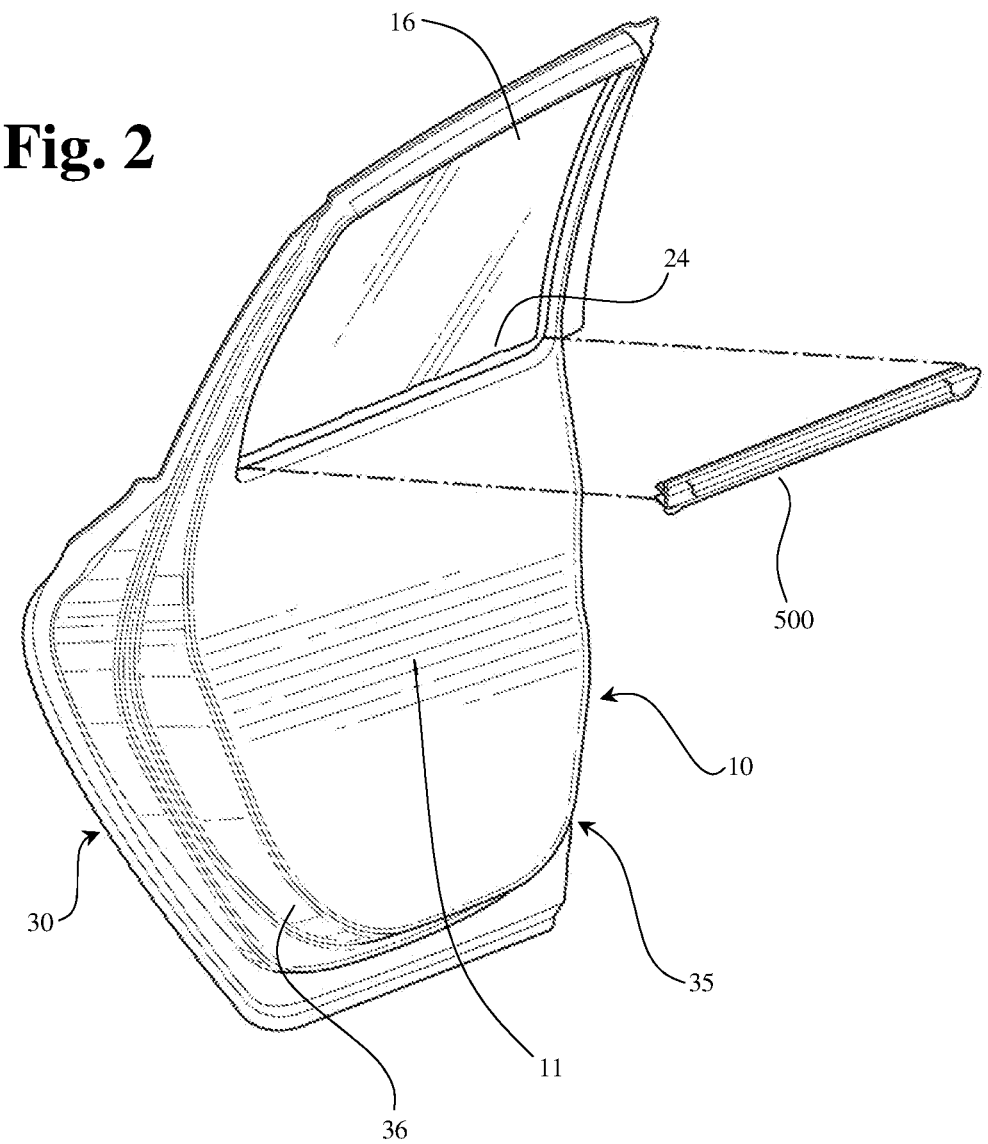
FIG. 2 is a perspective view of a rear driver-side door the same as or similar to that shown in FIG. 1, in accordance with one or more embodiments of the disclosure.

FIG. 2 is a perspective view of a rear driver-side door the same as or similar to that shown in FIG. 1, in accordance with one or more embodiments of the disclosure. FIG. 2 shows door panel assembly 10 that includes various structure including windowpane 16.

In exemplary embodiments, the windowpane 16 is movable between a closed position and an opened position. Referring to FIG. 2, the door assembly 10 can include an inner door panel 35. The inner door panel 35 can extend along a lower portion 11, e.g. below the opening 28, of the door assembly 10, in accordance with one or more embodiments. The inner door panel 35 can span the same or similar area to that of the outer door panel 30, which is on the opposing side of the door. The outer door panel 30 and the inner door panel 35 may be made by stamping suitable panels, such as from one or more pieces of sheet metal, such as but not limited to steel or aluminum, or by molding as a single piece from any appropriate material such as but not limited to plastic, fiberglass, carbon fiber, fiber-reinforced plastic, or any combination thereof.

The inner door panel 35 can be connected to the outer door panel 30 in any appropriate manner, such as but not limited to welding, adhesive bonding, crimping, self-piercing fasteners such as but not limited to screws or rivets, or any combination thereof. The outer and inner door panels 30, 35 can define one or more a closed cavities therein for containing one or more of the components, systems and assemblies of the door assembly 10 described herein.

The outer door panel 30 can abut or include the upper edge 24 of the lower portion of the door assembly 10. The outer door panel 30 can be generally triangular, rectangular or of other shape. An upper portion of the inner door panel 35 can be adjacent, and run alongside of, the upper edge 24 (of the outer door panel 30) of the door assembly 10. The inner door panel 35 can span the area of the lower portion of the door assembly 10.

As shown in FIG. 2, the inner door panel 35 may include a first inner door panel 36 as well as a second inner door panel (not shown in FIG. 2). Additionally, a door cover may be provided that covers the first inner door panel 36.

FIG. 2 also shows inner weatherstrip 500 in accordance with one or more embodiments. As generally shown in FIG. 2, the inner weatherstrip 500 may be provided along an upper edge of the inner door panel 35 and engage with the inner door panel 35 in manner as described below.

Figure 3:
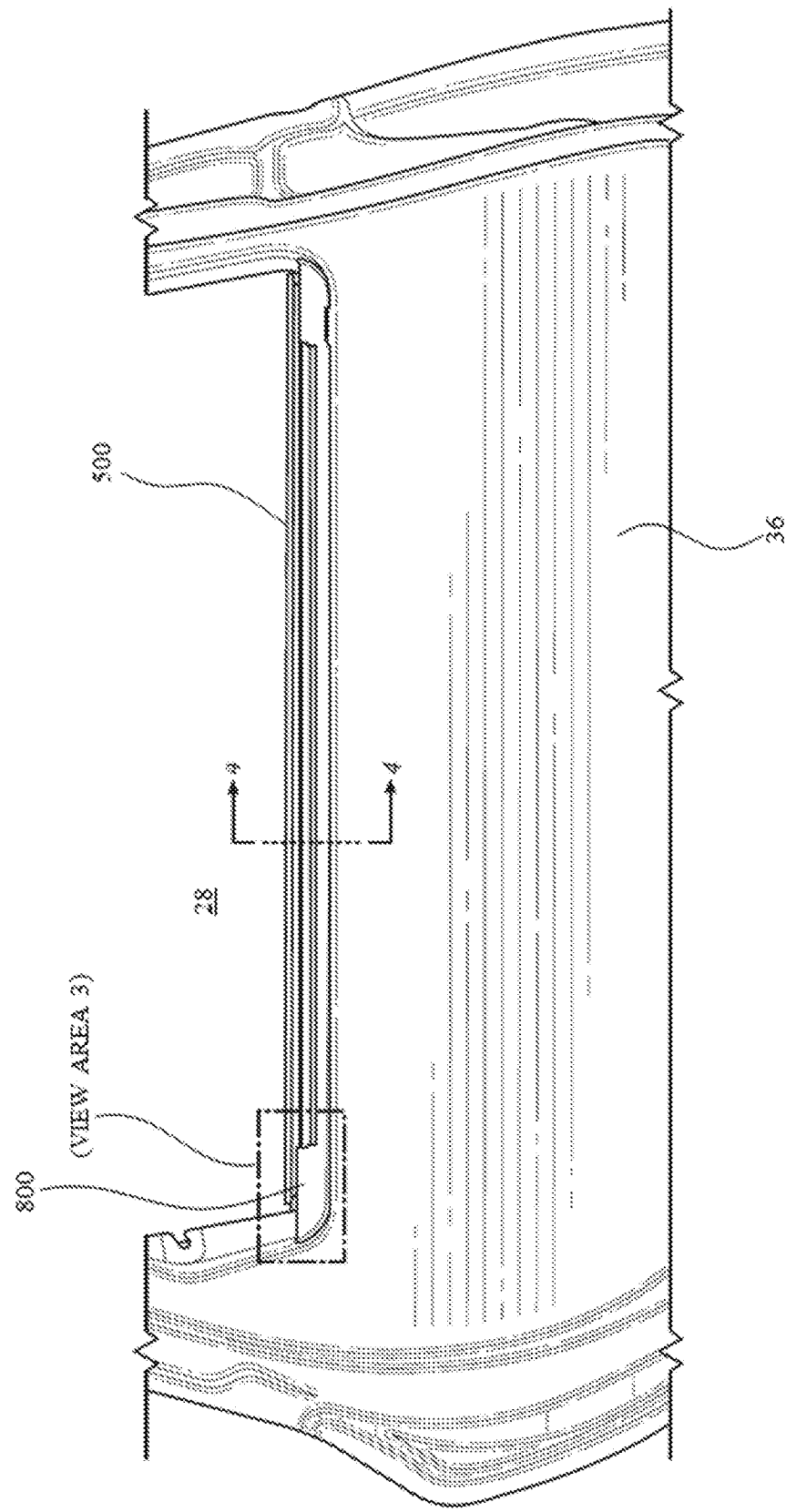
FIG. 3 is a perspective view of a rear driver-side door the same as or similar to that shown in FIG. 2, in accordance with one or more embodiments of the disclosure.

FIG. 3 is a perspective view of a rear driver-side door the same as or similar to that shown in FIG. 2, in accordance with one or more embodiments of the disclosure. FIG. 3 shows the first inner door panel 36. A door lining assembly can be attached to the inner door panel and provide a covering over or on the first inner door panel 36. The door lining assembly may provide an inner surface of the door that can be seen and touched by the occupant. The door lining assembly is omitted from the drawings for clarity and simplicity of the drawings.

FIG. 3 also shows the inner weatherstrip 500. As described otherwise herein, the inner weatherstrip 500 runs along a lower portion of opening 28 so as to provide a seal between a supporting door flange and the windowpane 16. The inner weatherstrip 500 can be attached to the first inner door panel 36 and/or the second inner door panel as described below.

FIG. 3 includes a view area 3 that shows positioning and general structure of an assembly 800, as would be viewed from an interior side of the door assembly 10, in accordance with one or more embodiments. The assembly 800 in the view area 3 may be constituted by the arrangement shown in FIG. 9 or may be constituted by the arrangement shown in FIG. 14, in accord with respective embodiments of the invention.

Various aspects of assembly 800, depicted in the position of view area 3, are described herein. However, such description is for purposes of illustration and the assembly 800 or mirror image arrangement of the assembly 800, as well as additional arrangements described herein, can be used at any position of the inner weatherstrip 500 as may be desired. It is also appreciated the connection structure as described herein may be used at an interim position or location along the length of the inner weatherstrip 500 as may be desired. Also, the connection assembly is not limited to use in conjunction with an inner weatherstrip. The connection assembly of the disclosure may be utilized in other environments of a vehicle so as to provide an effective sealing arrangement. For example, the connection assembly of the disclosure may be utilized in conjunction with an outer weatherstrip, i.e., provided on an exterior side of the windowpane 16 and an outer door panel 30.

Figure 4:
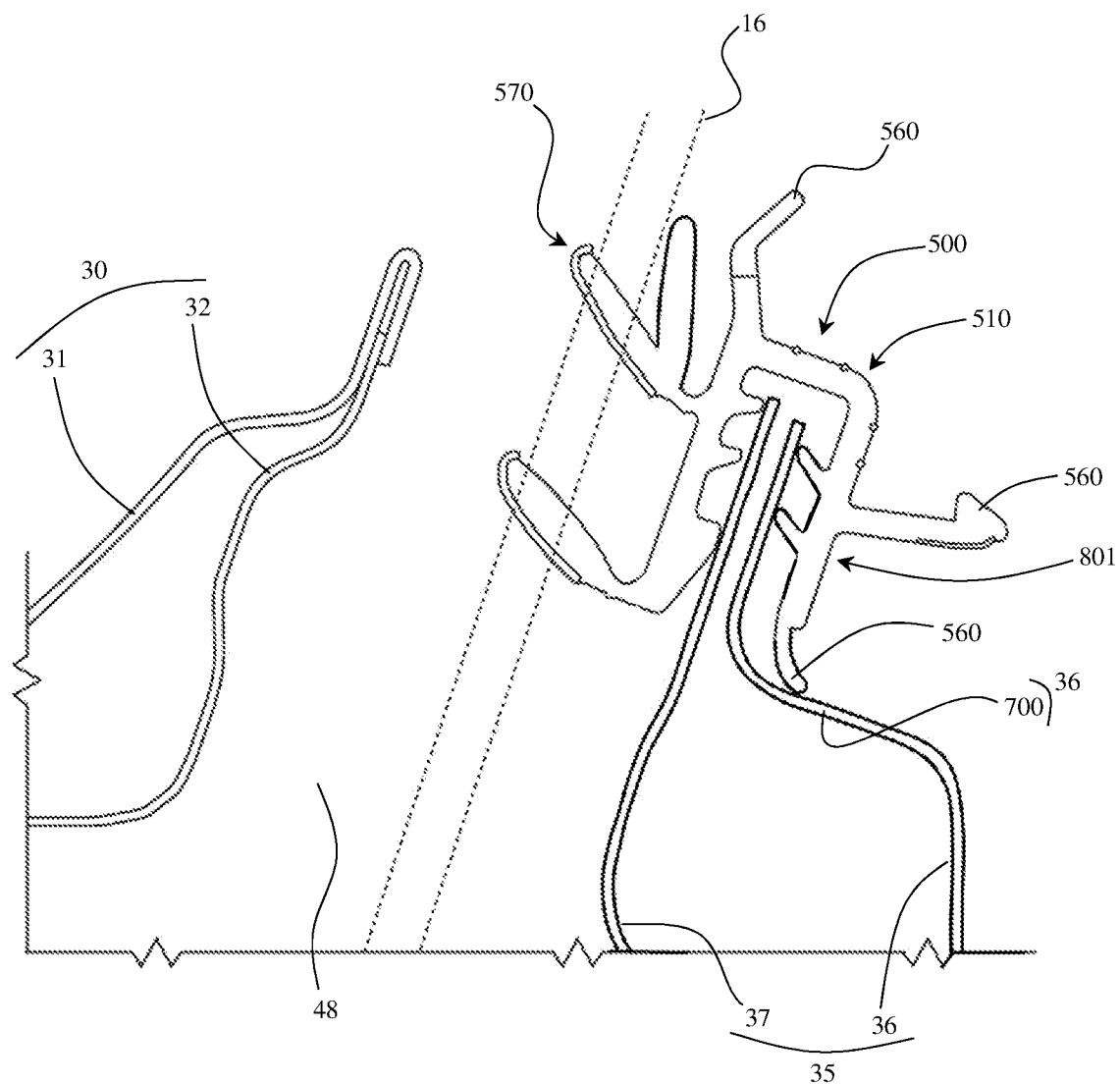
FIG. 4 is a schematic cross section view of a door with weatherstrip along lines 4-4 of FIG. 3, in accordance with one or more embodiments.

FIG. 4 is a schematic cross section view of a door with weatherstrip along lines 4-4 of FIG. 3, in accordance with one or more embodiments.

FIG. 4 is provided to show the environment of a connection assembly 801. The outer door panel 30 of FIG. 4 can be the same as or similar to that described above. The outer door panel 30 includes a first outer door panel 31 and a second outer door panel 32. The inner door panel 35 can be the same as or similar to that described above with reference to FIG. 1. The inner door panel 35 can include the first inner door panel 36 as well as a second inner door panel 37. An upper portion of the first inner door panel 36 includes or is constituted by a door flange 700. Illustratively, further details of the door flange 700 are described below with reference to FIG. 7.

Referring further to FIG. 4, the door assembly 10 can include an inner weatherstrip 500. The inner weatherstrip 500 can extend along or adjacent to the upper edge 24 of the lower portion of the door assembly 10. The inner weatherstrip 500 can follow the contour of the upper edge 24 of the door assembly 10. As shown in FIG. 4, the inner weatherstrip 500 can engage the interior surface of the windowpane 16.

The door assembly 10 can also include an outer weatherstrip (not shown) that extends along outer door panel 30 and along the upper edge 24 and/or constitutes the upper edge 24. The outer weatherstrip can engage the exterior surface of the windowpane 16. The inner and outer weatherstrips can impede or prevent at least a portion of debris and/or liquid on windowpane 16 from entering the closed cavity 48 formed by the outer and inner door panels 30, 35. The described outer weatherstrip has been omitted from FIG. 4 for simplicity and clarity of the drawings.

As shown in FIG. 4, the inner weatherstrip 500 can include a mounting member 510, panel seal assembly 560, and window seal assembly 570. The inner weatherstrip 500 and assemblies 520, 530 can be formed from any appropriate flexible material, such as but not limited to rubbers, plastics or composites thereof. The mounting member 510, panel seal assembly 560, and window seal assembly 570 can be integrally formed as a single piece. However, exemplary embodiments may alternatively include the mounting member 510 and assemblies 560, 570 being separately formed and later connected together in any appropriate manner, such as by adhesive or by heat bonding.

FIG. 4 shows cavity 48 may be provided or defined between the outer door panel 30 and the inner door panel 35. The windowpane 16 is movably housed within the cavity 48. Specifically, the windowpane 16 moves up and down within the cavity 48 so as to result in closing or opening of the window. FIG. 4 depicts the windowpane 16 in phantom to depict a situation in which windowpane 16 is in a fully lowered position, i.e. the window is fully opened. Relatedly, the window seal assembly 570 is elastically biased so as to extend onto a travel path of the windowpane 16. Accordingly, it should be appreciated that the window seal assembly 570, upon windowpane 16 contacting the window seal assembly 570, will be pushed upward, and to the right as shown in FIG. 4, thus providing for travel of the windowpane 16 in an upward direction. The window seal assembly 570 is biased against the windowpane 16 so as to provide the desired seal. Further details are described below.

Figure 5:
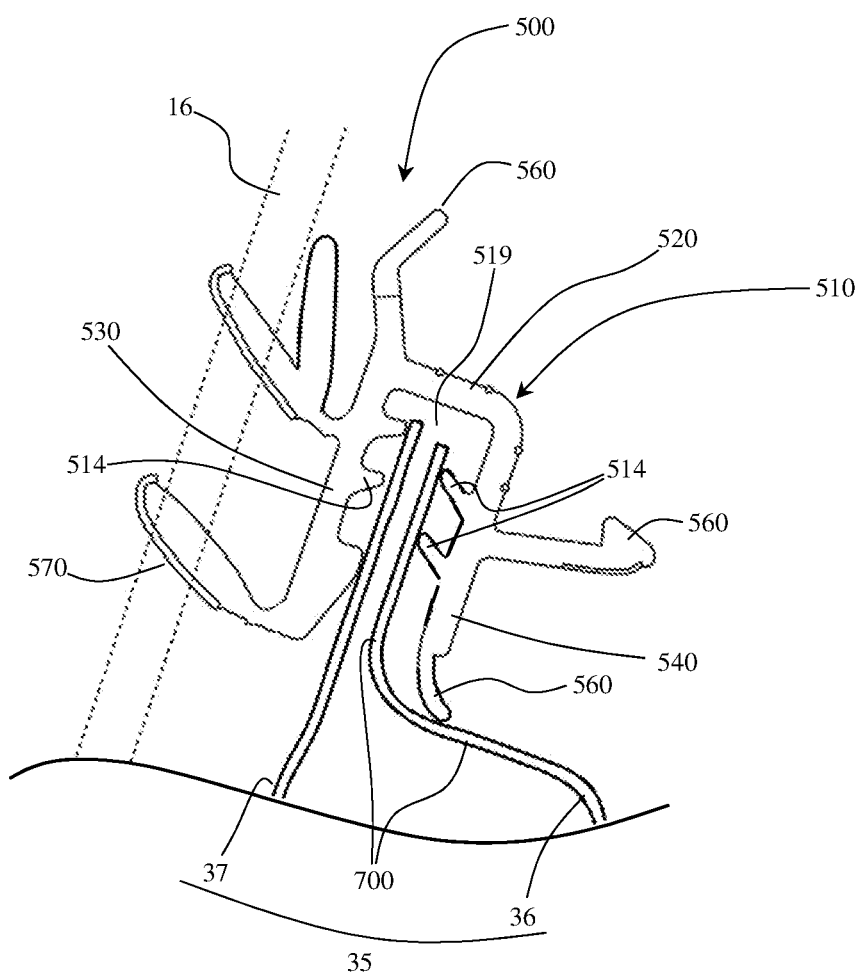
FIG. 5 is a schematic cross section view of a portion of a door, the same as or similar to the door shown in FIG. 4, showing details of a mounting member, in accordance with one or more embodiments of the disclosure.

FIG. 5 is a schematic cross section view of a portion of a door, the same as or similar to the door shown in FIG. 4, showing details of mounting member 510, in accordance with one or more embodiments. As shown in FIG. 5, the mounting member 510 can include a substantially U-shape. In particular, the mounting member 510 can include a cross wall 520, an outer side wall 530, and an inner side wall 540. The window seal assembly 570 may be mounted to the outer side wall 530 of the mounting member 510. The panel seal assembly 560, including the various components thereof, may be mounted to one or more of the cross wall 520, the outer side wall 530, and the inner side wall 540.

As shown in FIG. 5, the cross wall 520 serves to connect the outer side wall 530 and the inner side wall 540 to form a substantially inverted U-shaped cross-section. As a result, the mounting member 510 may define a cavity 519. The mounting member 510 may further include a plurality of internal protrusions 514. The internal protrusions 514 can extend into the cavity 519 of the mounting member 510. The internal protrusions 514 can be configured with an appropriate elasticity and length into the cavity 519 (of the mounting member 510) so that the internal protrusions 514 frictionally engage each side of the inner door panel 35, i.e. the inner door panels 36, 37. The flexure and frictional engagement by the internal protrusions 514, as well as the angle at which the internal protrusions 514 engage the inner door panel 35, can resist displacement of the mounting member 510 with respect to the inner door panel 35. Accordingly, the inner weatherstrip 500 can be secured upon the inner door panel 35.

Figure 6:
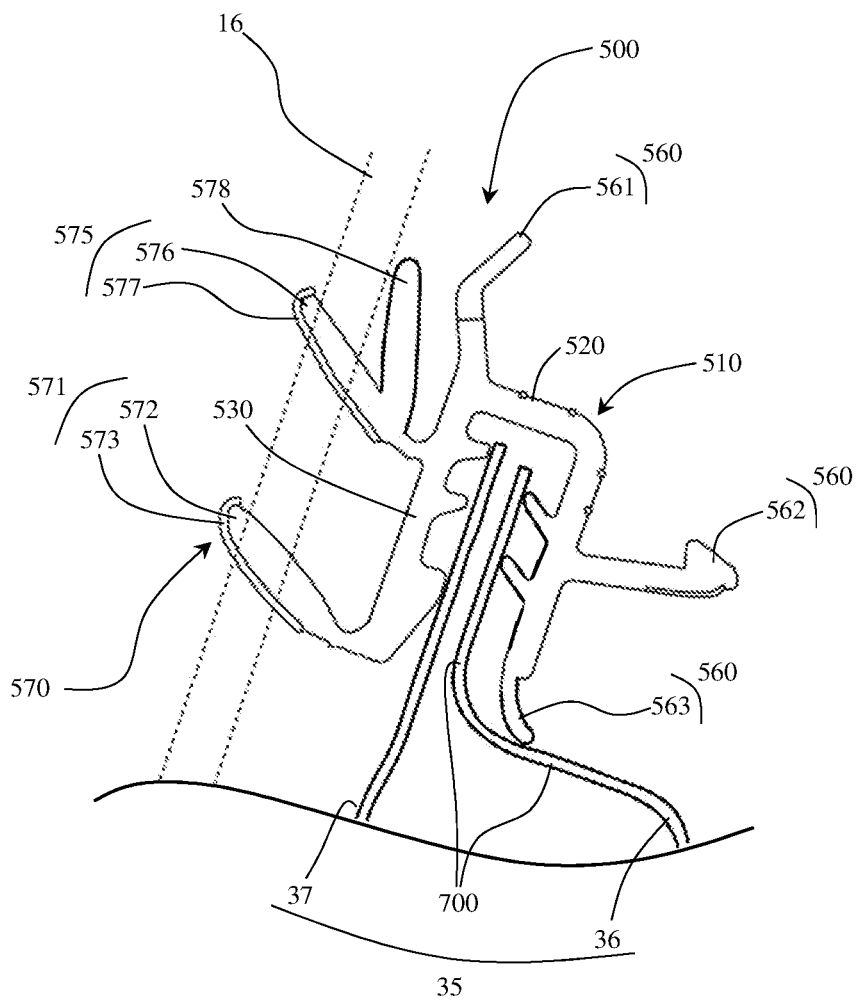
FIG. 6 is a schematic cross section view of a portion of a door, the same as or similar to the door shown in FIG. 4, showing details of the panel seal assembly and the window seal assembly, in accordance with one or more embodiments of the disclosure.

FIG. 6 is a schematic cross section view of a portion of a door, the same as or similar to the door shown in FIG. 4, showing details of the panel seal assembly 560 and the window seal assembly 570, in accordance with one or more embodiments of the disclosure.

As shown in FIG. 6, the window seal assembly 570 can include a lower flange seal 571 and an upper flange seal 575. Each of the flange seals 571, 575 can be supported by and cantilevered to the mounting member 510. The flange seals 571, 575 can engage the windowpane 16 as the windowpane 16 is actuated between the closed and opened positions. As described above, FIG. 6 illustrates a situation in which the windowpane 16 (shown in phantom in FIG. 6) is "rolled down." As a result, the flange seal 571 and the flange seal 575 are positioned in the "path of travel" of the windowpane 16. As the windowpane 16 is closed or moved up, the windowpane 16 can engage the flange seals 571, 575.

The flange seal 575 can include a V-shaped structure that includes a body portion 576 and a biasing flange 578. The body portion 576 can primarily engage windowpane 16 so as to provide the desired seal with the windowpane 16. The biasing flange 578 (upon the windowpane 16 engaging with the body portion 576) can be bent upwardly and to the right as shown in FIG. 6. As a result, the biasing flange 578 can engage with the flange seal 571. The body portion 576, which is pressed against windowpane 16, and the biasing flange 578, which is pressed against the flange seal 571, can be crushed, bent or compressed together so as to exert desired force of the body portion 576 upon the windowpane 16. Such operation and relationship can be provided by the resilient structure of the flange seal 575, which can be constructed of any appropriate material such as but not limited to rubber, synthetic rubber or plastic.

The window seal assembly 570 also includes flange seal 571. The flange seal 571 includes body portion 572. The flange seal 571 can provide a secondary seal so as to preclude water and other items from entering into cavity 48.

As shown in FIG. 6, the body portions 576, 572 can be covered or encapsulated by a respective covering 577, 573. The coverings 573, 577 can be constructed of a material that is more conducive to physical engagement with the windowpane 16 than is the material used to construct the body portions 572, 578.

As shown in FIG. 6, the inner weatherstrip 500 can further include panel seal assembly 560. The panel seal assembly 560 may include one or more of flange seal 561, flange 562 and flange seal 563.

For example, the flange seal 561 can extend from the mounting member 510 and toward the door lining or other appropriate panel or portion of the door assembly 10. The flange seal 561 can be cantilevered to the mounting member 510. The flange seal 561 can be connected to the mounting member 510 at the junction of the outer side wall 530 and the cross wall 520 of the mounting member 510. The flange seal 561 can extend along and be shaped to engage the surface of the door lining or other appropriate portion of the door assembly 10. As shown, the flange seal 561 can be configured with an arcuate or bent cross-sectional shape that is at least partially straightened (or unbent) by the engagement with a door lining or other appropriate portion of the door assembly so that the flange seal 561 is biased into engagement with a surface of the door lining or other appropriate portion of the door assembly.

The inner weatherstrip 500 can also include flange 562. The flange 562 can also extend from the mounting member 510 and toward the door lining or other appropriate panel or portion of door assembly 10. The flange seal 562 can be shaped or configured so as to engage the door lining or other structure.

Additionally, the inner weatherstrip 500 can include flange seal 563. The flange seal 563 may be provided to engage an upper surface of the first inner door panel 36. Such arrangement of the flange seal 563 engaging the first inner door panel 36 may provide for both positioning of the mounting member 510 as well as for stability of the mounting member 510.

Figure 7:
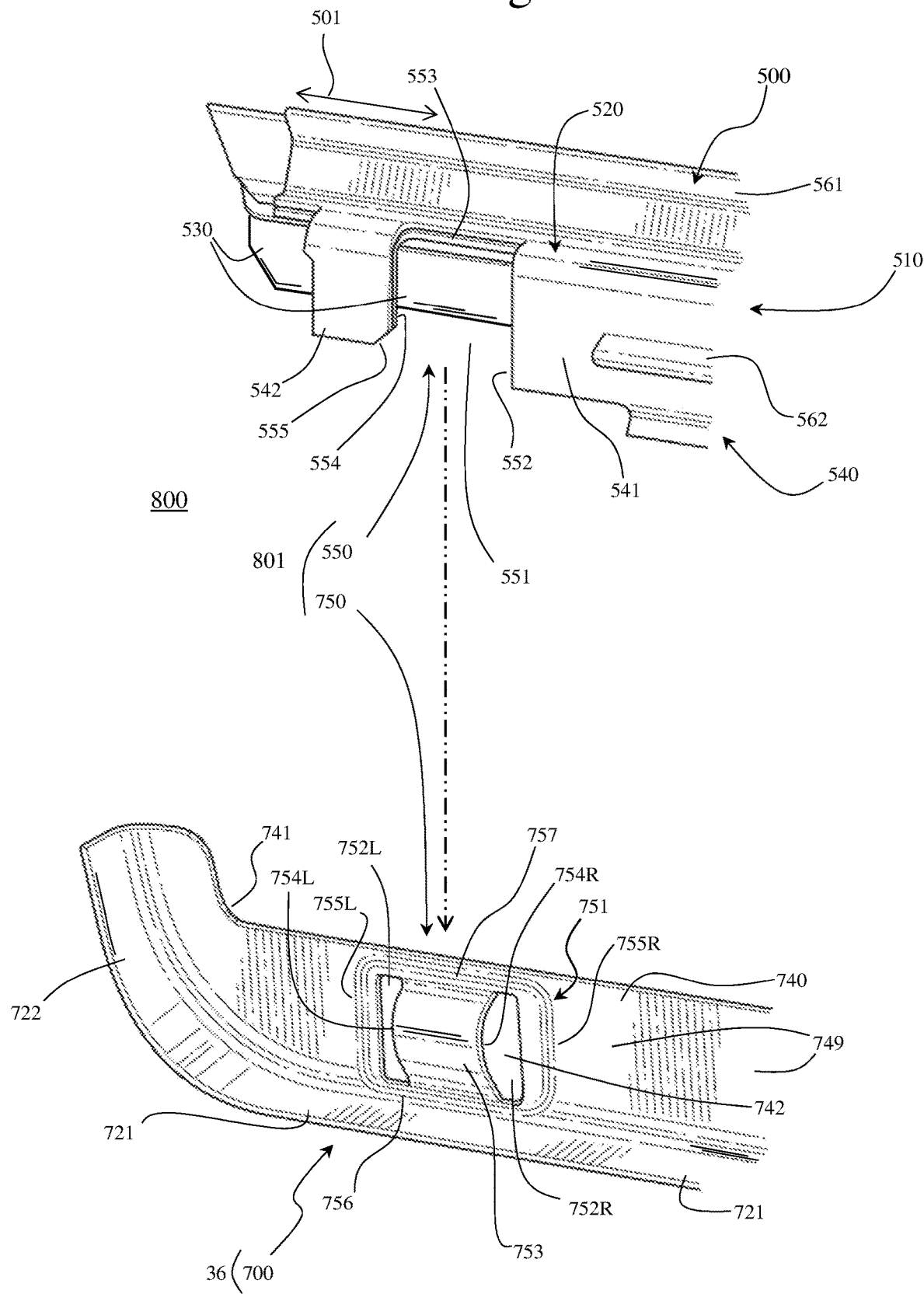
FIG. 7 is an exploded perspective view showing an inner weatherstrip and a door flange, constituting an assembly, and respective datum formations that collectively constitute a connection assembly, in accordance with one or more embodiments of the disclosure.

FIG. 7 is an exploded perspective view showing an inner weatherstrip 500 and a door flange 700, constituting an assembly 800, and respective datum formations 550, 750 that collectively constitute a connection assembly 801, in accordance with one or more embodiments of the disclosure.

The weatherstrip 500 includes a mounting member 510 that extends along a length axis 501 of the weatherstrip 500. In particular, the weatherstrip 500 may be constituted by an inner weatherstrip 500. The mounting member can include a side wall 540 that extends along the length axis 501. The side wall 540 can be constituted by an inner side wall 540 in accordance with one or more embodiments of the disclosure. The side wall 540 can include a weatherstrip datum formation 550.

Further, the assembly 800 can include door flange 700. The door flange 700 can be attached to or be an integral piece of the first inner door panel 36 as shown in FIG. 4, for example. Accordingly, the door flange 700 can be configured to integrate with an inner door panel, i.e. be that integration either integral construction or piece construction. The door flange 700 includes a flange datum formation 750. The weatherstrip datum formation 550 engages with the flange datum formation 750 so as to precisely and accurately position the weatherstrip 500 relative to the door flange 700. In particular, the weatherstrip datum formation 550 engages with the flange datum formation 700 so as to precisely and accurately position the inner weatherstrip 500 upon the door flange 700 in a correct position along the length axis 501. Such positioning provides a desired end result of the ends, end caps, or other terminus of the weatherstrip 500 being accurately positioned relative to the corners of the window opening, and can be repeated in mass production with a precision that can provide a predetermined level of seal quality.

As shown in FIG. 7, the weatherstrip datum formation 550 may include a notch 551 provided in the side wall 540. The side wall 540 can include a mid portion 541 that includes a side edge 552. Additionally, the side wall 540 can include end portion 542 that includes a side edge 554. The notch 551 can be defined, at least in part, by the side edge 552 of the mid portion 541 and the side edge 554 of the end portion 542. The notch 551 is configured and adapted to receive a portion of the flange datum formation 750. As described below, the notch 551 can be configured and adapted to receive a guide protuberance 753. However, the disclosure is not limited to such specific structure.

For purposes of illustration, the portion 542 is designated as an "end" portion. The end portion 542 may indeed be positioned adjacent to an end of the weatherstrip 500. Such positioning may be desirable so as to afford accurate positioning of each end of the inner weatherstrip 500 (upon the door flange 700). However, it is appreciated that notch 551, or other weatherstrip datum formation 550, as well as corresponding flange datum formation, may be positioned anywhere along the length of the weatherstrip 500 as may be desired.

As described above, the mounting member 510 may include a cross wall 520. The cross wall 520 may run along the length axis 501 of the inner weatherstrip 500 in parallel to and connected, along the length axis, to an upper edge of the side wall 540. In other words, an upper edge of the side wall 540 can be joined to, and run in parallel to, a side edge of the cross wall 520 along the length of the inner weatherstrip 500. Relatedly, the notch 551 can extend through the side wall 540 and into the cross wall 520. Accordingly, the cross wall 520 can include cutout 553 that defines a portion of the notch 551. The notch 551 can be characterized as "open" at the top of the notch 551. The amount or degree to which the notch 551, i.e. the cut out 553, extends into the cross wall 520 may be varied in manufacturing/construction as may be desired. Such arrangement can be beneficial for the manufacturing of the weatherstrip datum formation 550. For example the inner weatherstrip 500 can be manufactured by an extrusion molding process. After extruding the inner weather strip 500, the weatherstrip datum formation 550 can be subjected to a machining process that removes material of the side wall 540 and a portion of the cross wall 520; thereby forming the notch 551 and the cutout 553. Further, such arrangement can be beneficial in effectively engaging with the flange datum formation 750. That is, the structure of notch 551 may be beneficial in providing desired fit or mate of the weatherstrip datum formation 550 with the flange datum formation 750.

For purposes of clarity and explanation, the cross wall 520 may be characterized as extending in an anteroposterior, i.e. front to back of the vehicle, horizontal plane along the length axis 501. The side wall or inner side wall 540 may be characterized as extending in an anteroposterior, i.e. front to back, vertical plane along the length axis 501. Accordingly, the cross wall 520 and the side wall 540 can be oriented at right angles to each other and connected at respective edges thereof along the length axis 501. However, in at least some embodiments of the invention, such angular and spatial relationship between the cross wall 520 and the side wall 540 may be different.

As shown in FIG. 7, the side edge 552 and the side edge 554 may be parallel to each other. Such relationship may provide and facilitate the weatherstrip 502 slidably engaging with the door flange 700, i.e., for the weatherstrip datum formation 550 to effectively and easily engage with the flange datum formation 750. As is shown in FIG. 7, the side edge 552 and the side edge 554 may each extend perpendicular to the length axis 501 of the weatherstrip 500.

In at least some embodiments of the disclosure, the end portion 542 may be in the form of a tab or tab-like structure. Such structure may be beneficial in assembly of the weatherstrip 500 upon the door flange 700. For example, the end portion or tab 542 can be helpful in manual or automated handling and manipulation of the inner weatherstrip 500 during assembly onto the inner door panel 35.

As shown in FIG. 7, the notch 551 may be opened at a lower portion thereof. Such structure allows the flange datum formation 750, or portion thereof, to slide into the notch 551. To assist in assembly, the end portion 542 may be provided with a bevel 555 or other type of rounded edge so as to guide the flange datum formation into the notch 551. The mid portion 541 and/or side edge 552 may also be a provided with a bevel so as to guide the flange datum formation 750 into the notch 551.

In accord with at least some embodiments of the invention, the side wall 540 (of the mounting member 510) may run along the length axis 501 of the weatherstrip. The side wall 540 can be positioned relative to the door flange 700 such that the side wall is supported by the door flange 700. Accordingly, the door flange 700 may be characterized as including a support wall 740. The support wall 740 can be a vertical or substantially vertical wall that is positioned against the side wall 540. The side wall 540 can be positioned in a substantially parallel manner relative to the support wall 740.

As shown in FIG. 7, the flange datum formation 750 can include a guide protuberance 753. The guide protuberance 753 can be in the form of a segment, strip, or portion of material that forms an arcuate bridge type segment or structure. The guide protuberance 753 might also or alternatively be characterized as constituting a curved band or strip of material having a bridge or arched shape. The guide protuberance 753 is configured to be received into the notch 551 of the side wall 540.

In further explanation, the guide protuberance 753 may be constituted by a bridge segment of material that extends between a first portion of the door flange and a second portion of the door flange. More specifically, the guide protuberance 753 may be constituted by a bridge segment of material that extends between a first portion of the support wall 740 and a second portion of the support wall 740. The first portion may be positioned directly above the second portion, such that the guide protuberance 753 is oriented with a first connection above a second connection. As shown in FIG. 7, the guide protuberance 753 can be in the form of a bridge segment of material that is arcuate in shape and that possesses uniform geometry, along a width thereof, along the length axis 501.

The door flange 700 may be characterized as including a dominant surface 749. In other words, the dominant surface 749 can compose or make up a substantial majority of the surface (of the door flange 700) to which the weatherstrip 500 is positioned adjacent. The guide protuberance 753 extends outwardly from such dominant surface 749. The flange datum formation 750 may further include a raised frame, rim, or skirt 751 that surrounds the guide protuberance 753. The raised frame 751 provides a raised surface, which is raised from the dominant surface 749 of the door flange 700. The raised frame 751 may be helpful in attaining a secure, snug and accurate fit between the door flange 700 and the inner weatherstrip 500.

As described above, the mounting member 510 also includes outer side wall 530. As shown in FIG. 5, the door flange 700, as well as the second inner door panel 37, can be effectively and securely "sandwiched" between the outer side wall 530 and the inner side wall 540 in conjunction with the inner weatherstrip 500 being accurately positioned utilizing the connection assembly 801. It is appreciated that any of the door panels described herein, components of the mounting member 510, components of the window seal assembly 570, components of the panel seal assemblies 560, and other structure described herein may be constructed in layers, composites, and/or pieces, for example, as may be desired.

As described above, the flange datum formation 750 may include a raised frame 751. The raised frame 751 may include an upper raised portion 757, a lower raised portion 756, a left raised portion 755L, and a right raised portion 755R. As a result, a frame may be formed by the plurality of raised portions. The guide protuberance 753 may be connected at a first extent to the upper raised portion 757 and may be connected to an opposing extent to the lower raised portion 756. The flange datum formation 750 may also include openings 752L, 752R that extend from left and right edges 754L, 754R of the guide protuberance 753 to the left and right raised portions 755L, 755R, respectively. The guide protuberance 753 may be constituted by a strip or strap of material such that the support wall 740 includes an opening 742 through the support wall 740 that opposes a rear face of the guide protuberance 753. The openings 752L, 752R effectively space the guide protuberance 753 from the raised portion 755R and the raised portion 755L. In manufacturing, the guide protuberance 753 may be formed by stamping the guide protuberance 753 from the support wall 740 by a stamping process that cuts the edges 754L, 754R from the support wall 740 and bends the guide protuberance 753 so as to obtain the shape shown in FIG. 7. It is appreciated that the degree of arcuate shape may be provided as desired.

However, in some embodiments of the disclosure, the flange datum formation 750 may be an insert that is inserted into a stamped or cut opening in the dominant surface 749. Such construction may be beneficial in that manipulation or processing of the door flange 700 is limited to punching or cutting a hole so as to accept the insert.

The door flange 700 may also be provided with structure so as to engage or interface effectively with a corresponding structure adjacent to a corner of the particular window. Accordingly, the door flange 700 may include a length flange portion 721 that extends along a substantial length of the door flange 700. On opposing ends of the door flange 700, the structure may include an end flange portion 722. Illustratively, the end flange portion 722 may be curved or swept up so as to interface with the corner of a window opening. In particular, the end flange portion 722 may be defined by a corner 741.

Figure 8:
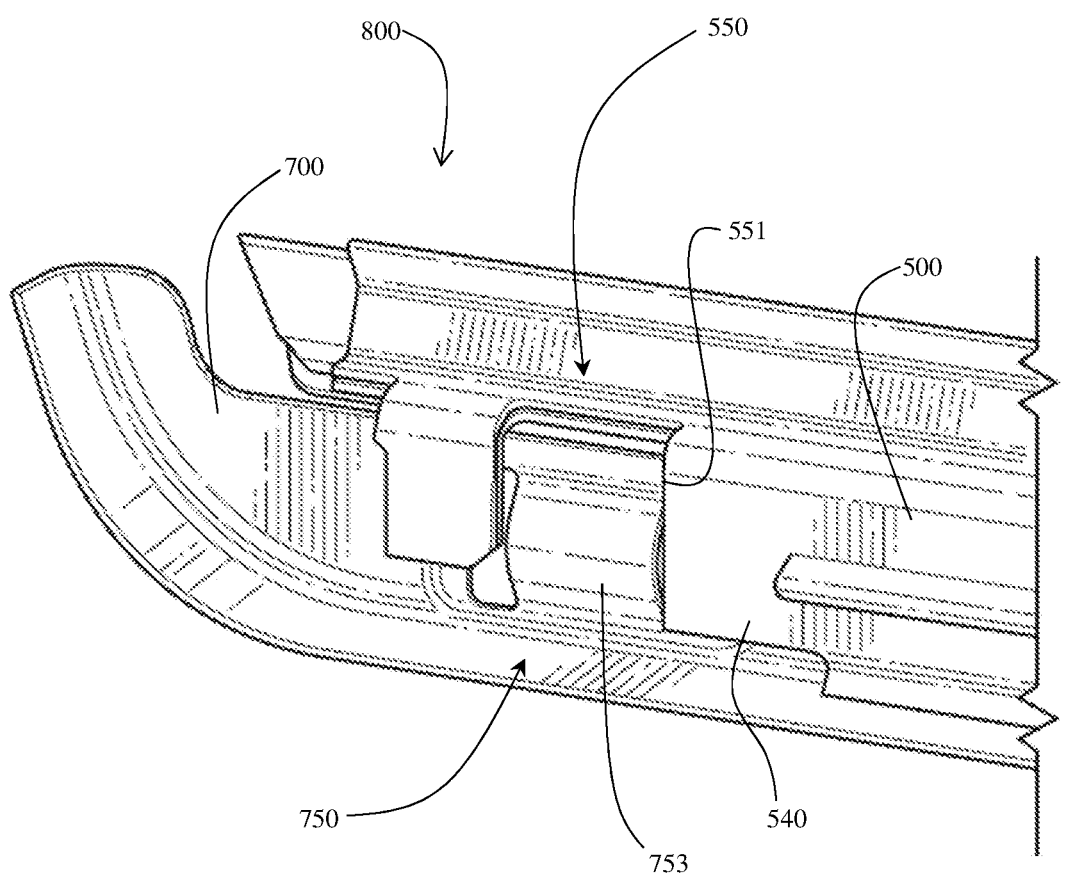
FIG. 8 is a perspective view showing an inner weatherstrip and a door flange, constituting an assembly, the same as or similar to that shown in FIG. 7, in accordance with one or more embodiments of the disclosure.

FIG. 8 is a perspective view showing an inner weatherstrip 500 and a door flange 700, constituting an assembly 800, the same as or similar to that shown in FIG. 7, in accordance with one or more embodiments of the disclosure.

In particular, FIG. 8 shows weatherstrip datum formation 550 engaged with flange datum formation 750. In such engagement, guide protuberance 753 (of the door flange 700) is slid into notch 551 (of the side wall 540).

Figure 9:
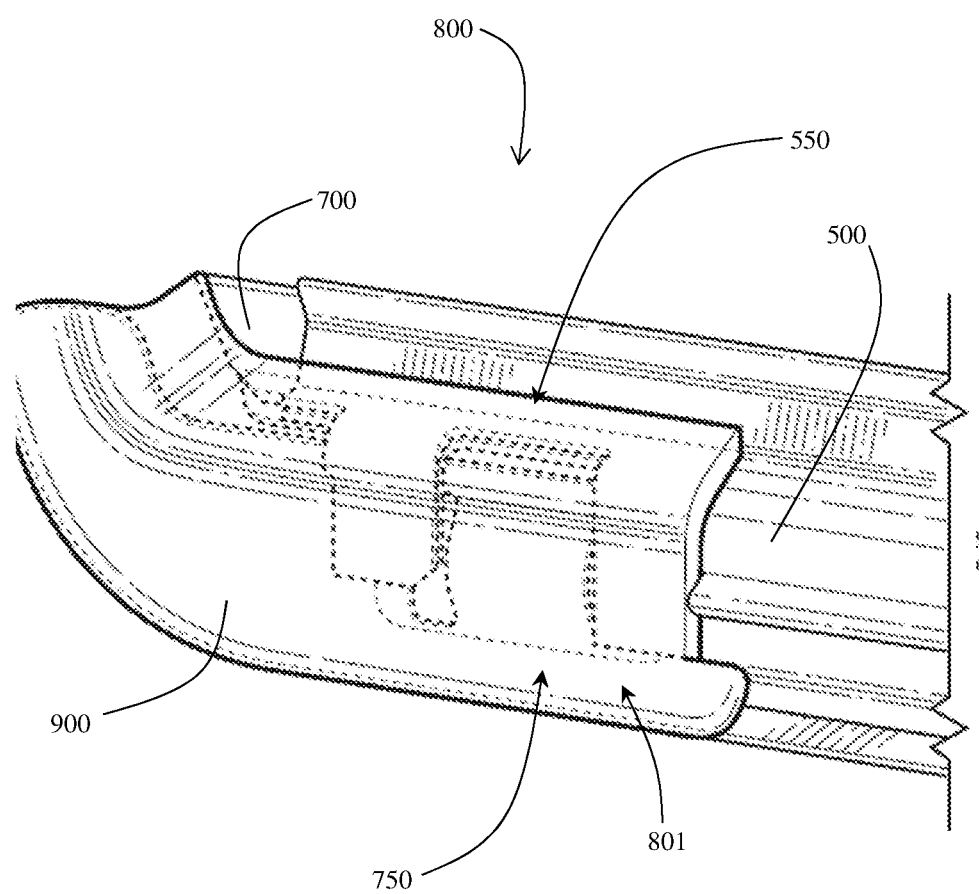
FIG. 9 is a perspective view showing an inner weatherstrip and a door flange, constituting an assembly, the same as or similar to that shown in FIG. 7, with an end cap, in accordance with one or more embodiments of the disclosure.

FIG. 9 is a perspective view showing an inner weatherstrip 500 and a door flange 700, constituting an assembly 800, the same as or similar to that shown in FIG. 7, with end cap 900, in accordance with one or more embodiments of the disclosure. The end cap 900 is omitted from FIGS. 7 and 8 for clarity and simplicity of the drawings. FIG. 9 shows weatherstrip datum formation 550 engaged with flange datum formation 750. In particular, FIG. 9 shows overmolded end cap 900, in accordance with one or more embodiments of the disclosure. The end cap 900 may be constituted by a piece of molded material that is dimensioned and shaped so as to cover the connection assembly 801. Specifically, the end cap 900 covers the weatherstrip datum formation 550 and the flange datum formation 750. The end cap 900 may be complementary to, mate with, or engage other structure of the weatherstrip 500, the door flange 700, or other structure as desired or appropriate. For example, the end cap 900 can form a seal with the length flange portion 721 and the end flange portion 722 shown in FIG. 7.

Figure 10:
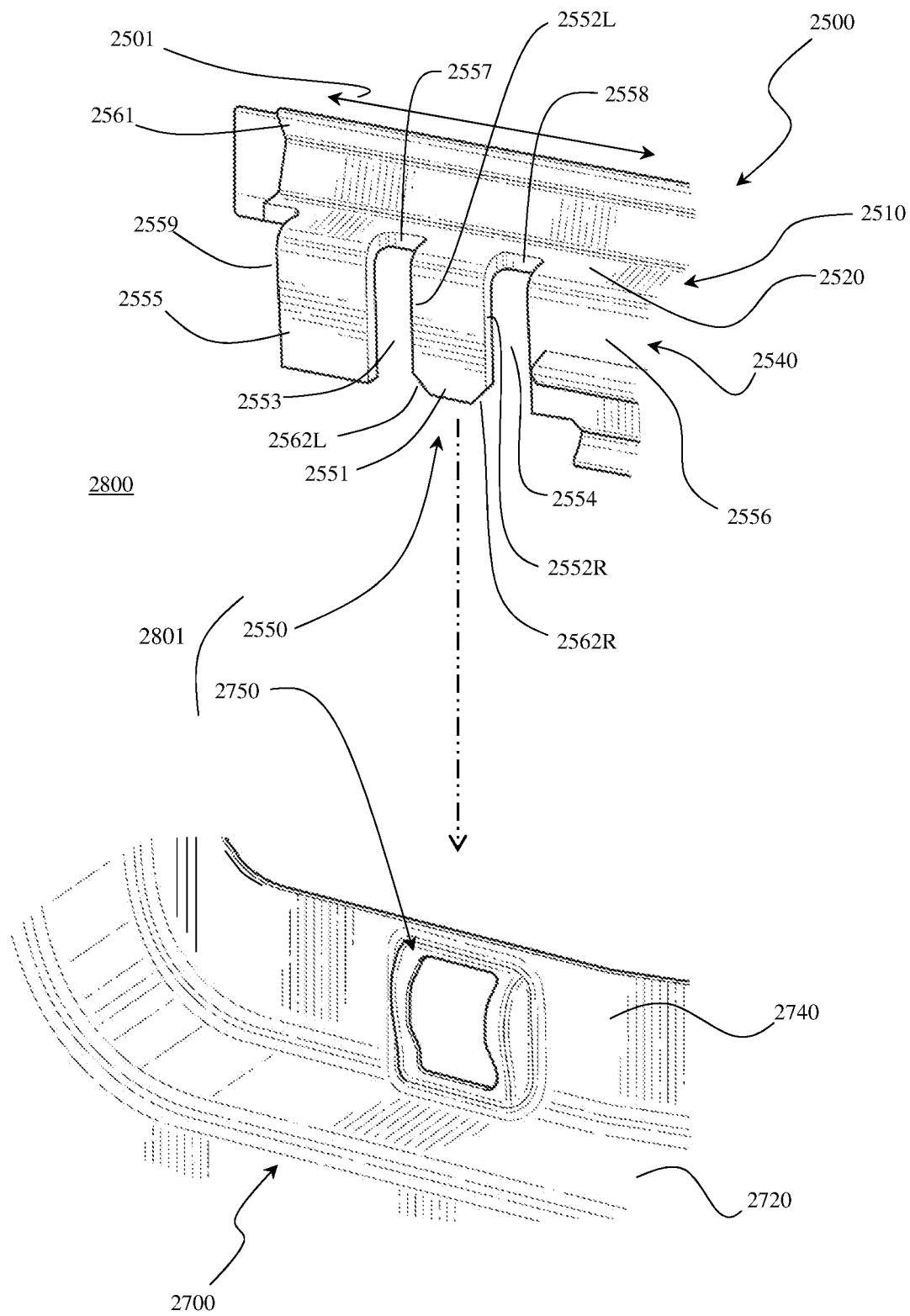
FIG. 10 is an exploded perspective view showing an inner weatherstrip and a door flange, constituting an assembly, and respective datum formations that collectively constitute a connection assembly, in accordance with one or more embodiments of the disclosure.
Figure 11:
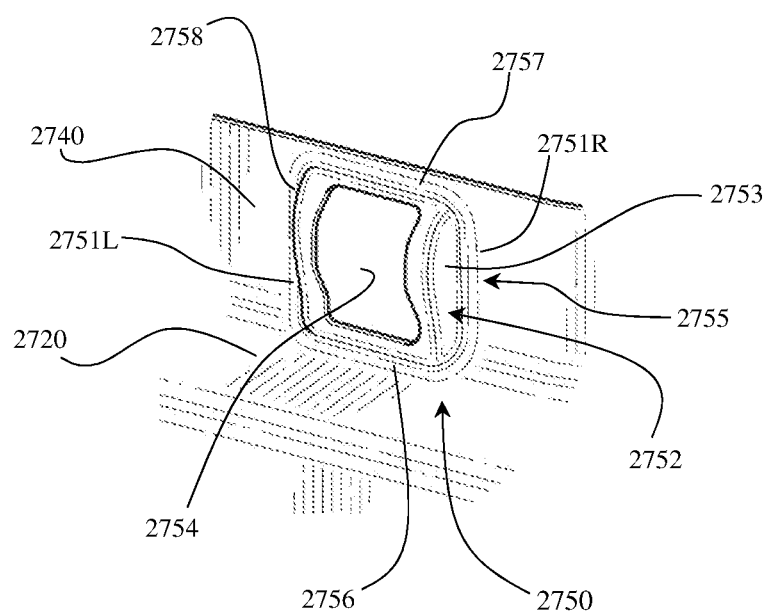
FIG. 11 is a perspective view showing a flange datum formation the same as or similar to that shown in FIG. 10, in accordance with one or more embodiments of the disclosure.

FIG. 10 is an exploded perspective view showing an inner weatherstrip 2500 and a door flange 2700, constituting an assembly 2800, and respective datum formations 2550, 2750 that collectively constitute a connection assembly 2801, in accordance with one or more embodiments of the disclosure. Relatedly, FIG. 11 is a perspective view showing a flange datum formation 2750 the same as or similar to that shown in FIG. 10, in accordance with one or more embodiments of the disclosure.

The weatherstrip 2500 includes a mounting member 2510 that extends along a length axis 2501 of the weatherstrip 2500. In particular, the weatherstrip 2500 may be constituted by an inner weatherstrip 2500. The weatherstrip 2500 may include a flange seal 2561 for interfacing with or engaging with an appropriate door panel as may be desired. The mounting member 2510 can include a side wall 2540 that extends along axis 2501 alongside a cross wall 2520. The side wall 2540 can be constituted by an inner side wall in accordance with one or more embodiments of the disclosure. The side wall 2540 can include a weatherstrip datum formation 2550.

Further, the assembly 2800 can include door flange 2700. The door flange 2700 can be attached to or be an integral piece of the first inner door panel 36 of shown in FIG. 4 in place of the door flange 700, for example. Accordingly, the door flange 2700 can be configured to integrate with an inner door panel, i.e. be that integration either integral construction or piece construction. The door flange 2700 can include a vertical support wall 2740 and flange 2720. The flange 2720 may be orthogonal or substantially orthogonal to the support wall 2740 so as to provide structural strength. The door flange 2700 includes a flange datum formation 2750. The weatherstrip datum formation 2550 engages with the flange datum formation 2750 so as to accurately position the weatherstrip 2500 relative to the door flange 2700. In particular, the weatherstrip datum formation 2550 engages with the flange datum formation 2750 so as to accurately position the inner weatherstrip 2500 upon the door flange 2700 in a correct position along the length axis 2501. Such accurate positioning provides a desired result of the ends, end caps, or other terminus of the weatherstrip 2500 being accurately positioned relative to the corners of the window opening.

In the arrangement of FIG. 10, the weatherstrip datum formation 2550 includes a tab or tab portion 2551. The tab 2551 may be defined by opposing side edges 2552L, 2552R. In other words, the tab 2551 may be positioned between and defined by notch 2553 and notch 2554. Each of the notches 2553, 2554 may extend into cross wall 2520 a desired distance. Accordingly, the cross wall 2520 can include cutouts 2557, 2558 that define a respective portion of the notches 2553, 2554. As a result, the notches 2553, 2554 can be characterized as "open" at the top of each of each of the notches 2553, 2554. The amount or degree to which the notches 2553, 2554, i.e. the cutouts 2557, 2558, extend into the cross wall 2520 may be varied in manufacturing/construction as may be desired. Such arrangement can be beneficial for the manufacturing of the weatherstrip datum formation 2550. For example the inner weatherstrip 2500 can be manufactured by an extrusion molding process. After extruding the inner weather strip 2500, the weatherstrip datum formation 2550 can be subjected to a machining process that removes material of the side wall 2540 and a portion of the cross wall 2520; thereby forming the notches 2553, 2554 and the cutouts 2557, 2557. Further, as a result of such structure, the tab 2551 can be more exposed so as to engage with the flange datum formation 2750. In other words, the tab 2551 can take on the form of a "finger" or "tab" so as to engage the flange datum formation 2750.

As is shown in FIG. 10, the side wall 2540 includes a mid portion 2556 that can extend along a length of the weatherstrip 2500. Also, the side wall 2540 includes an end portion 2555 that can extend along a length of the weatherstrip 2500. As shown in FIG. 10, the end portion 2555 is truncated or shortened at side 2559. Such structure may be provided at an end or terminus of the weatherstrip 2500. However, in the situation that the weatherstrip datum formation 2550 and corresponding flange datum formation 2750 is utilized away from an end of the weatherstrip 2500, such as in the center of the weatherstrip, then the position of the side 2559 can be varied or extended as desired.

The tab 2551 can be provided with a left bevel 2562L and a right bevel 2562R. Such bevels may assist in ease of assembly with sliding the tab 2551 into the flange datum formation 2750. That is, as described below, the flange datum formation 2750 may include a receiving opening 2754. The receiving opening 2754 may slidably receive the tab 2551, i.e. so as to accurately attach and position the weatherstrip 2500 with respect to the support wall 2740. The bevels 2562L, 2562R may assist in such assembly.

With the arrangement of FIG. 10, the weatherstrip datum formation can include tab 2551 that is defined by the first notch 2553 and the second notch 2554 disposed in side wall 2540. The door flange 2700 can include a support wall 2740. A flange datum formation 2750 can be provided on the support wall. Referring to FIG. 11, the flange datum formation 2750 can include a raised profile portion 2752 that extends from support wall 2740. The raised profile portion can include a receiving opening 2754 formed therein. The receiving opening 2754 can be configured to receive tab 2551.

As shown in FIG. 11, the raised profile portion 2752 can include side wall 2753 and side wall 2758. The receiving opening 2754 can extend between the side walls 2753, 2758 such that the receiving opening 2754 spaces apart the side walls 2753, 2758 from each other. The side wall 2753 can extend out from the support wall in varying profile depth, in a bulbous or arcuate manner along a first periphery of a raised profile portion 2752. In the example of FIG. 11, such first periphery is along the right-hand side or front side (of the vehicle) of the raised profile portion 2752. The side wall 2758 can extend out from the support wall in varying profile depth, in a bulbous or arcuate manner along a second periphery of the raised profile portion 2752. In the example of FIG. 11, such second periphery is along the left-hand side or back side (of the vehicle) of the raised profile portion 2752. The receiving opening 2754 may be provided between and defined by the side walls 2753, 2758.

The flange datum formation 2750 may also include a raised platform 2755. The raised platform 2755 may assist in providing an effective engagement or seating surface so as to engage the side wall 2540 of the weatherstrip 2500. The raised platform 2755, provided on support wall 2740, may include an upper raised portion 2757, a lower raised portion 2756, a left raised portion 2751L, and a right raised portion 2751R.

In some embodiments of the disclosure, the flange datum formation 2750 is integrally formed with the support wall 2740 such as by a stamping process in which material of the support wall 2740 is removed to form the receiving opening 2754 and the raised profile portion 2752 and is bent relative to the support wall 2740. However, in other embodiments, the flange datum formation 2750 can be constructed by providing a hole or aperture in the support wall 2740 with an insert provided in such hole or aperture.

Figure 12:
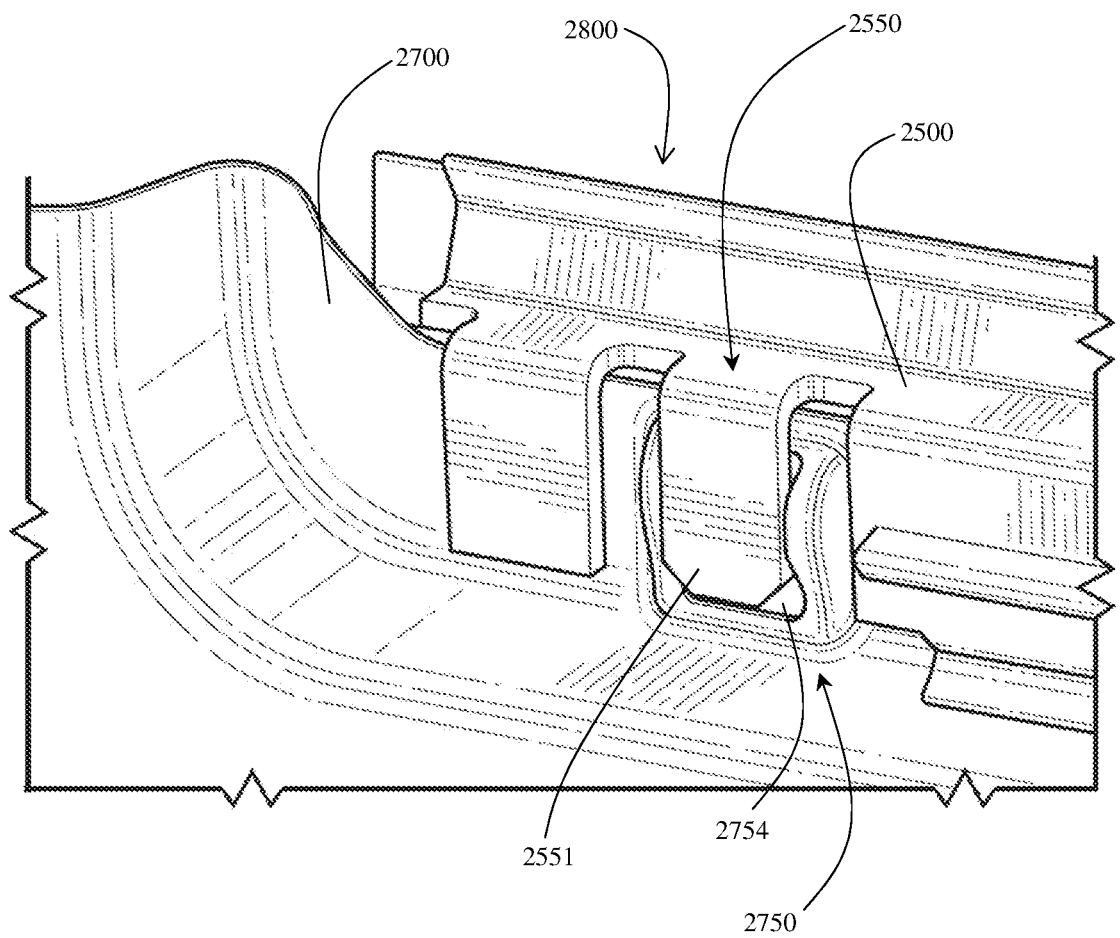
FIG. 12 is a perspective view showing an inner weatherstrip and a door flange, constituting an assembly, the same as or similar to that shown in FIG. 10, in accordance with one or more embodiments of the disclosure.

FIG. 12 is a perspective view showing an inner weatherstrip 2500 and a door flange 2700, constituting an assembly 2800, the same as or similar to that shown in FIG. 10, in accordance with one or more embodiments of the disclosure.

In particular, FIG. 12 shows weatherstrip datum formation 2550 engaged with flange datum formation 2750. In such engagement, tab 2551 is slid between the side walls 2753, 2758 and into the receiving opening 2754 and retained by the raised platform 2755.

Figure 13:
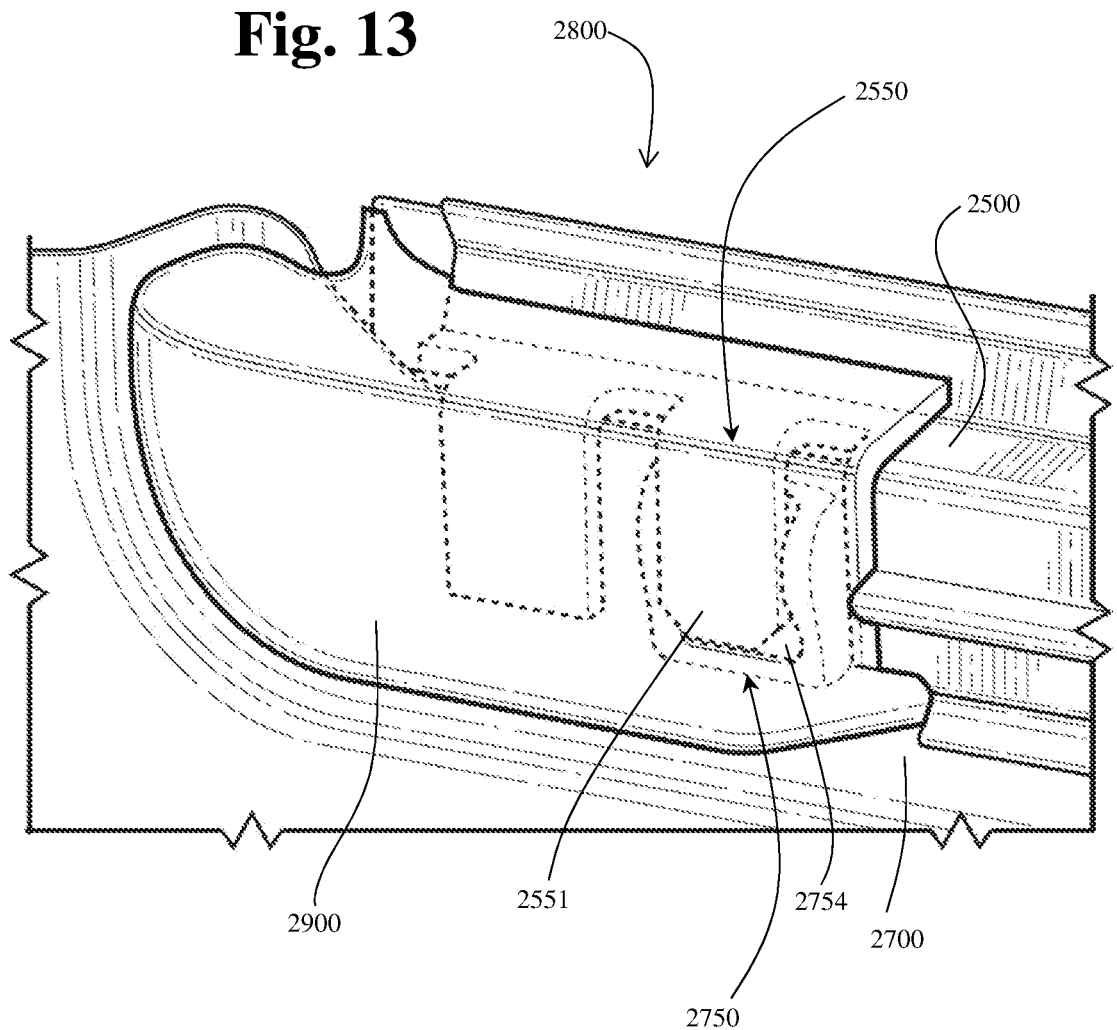
FIG. 13 is a perspective view showing an inner weatherstrip and a door flange, constituting an assembly, the same as or similar to that shown in FIG. 10, with an end cap, in accordance with one or more embodiments of the disclosure.

FIG. 13 is a perspective view showing an inner weatherstrip 2500 and a door flange 2700, constituting an assembly 2800, the same as or similar to that shown in FIG. 10, with end cap 2900, in accordance with one or more embodiments of the disclosure. FIG. 13 shows weatherstrip datum formation 2550 engaged with flange datum formation 2750. In such engagement, tab 2551 is slid between the side walls 2753, 2758 and into the receiving opening 2754 and retained by the side walls 2753, 2758.

In particular, FIG. 13 shows overmolded end cap 2900, in accordance with one or more embodiments of the disclosure. The end cap 2900 may be constituted by a piece of molded material that is dimensioned and shaped so as to cover the connection assembly 2801. Specifically, the end cap 2900 covers the weatherstrip datum formation 2550 and the flange datum formation 2750. The end cap 2900 may be complementary to, mate with, or engage other structure of the weatherstrip 2500, the door flange 2700, or other structure as desired or appropriate. The end cap 2900 is omitted from FIGS. 10 and 12 for clarity and simplicity of the drawings.

Figure 14:
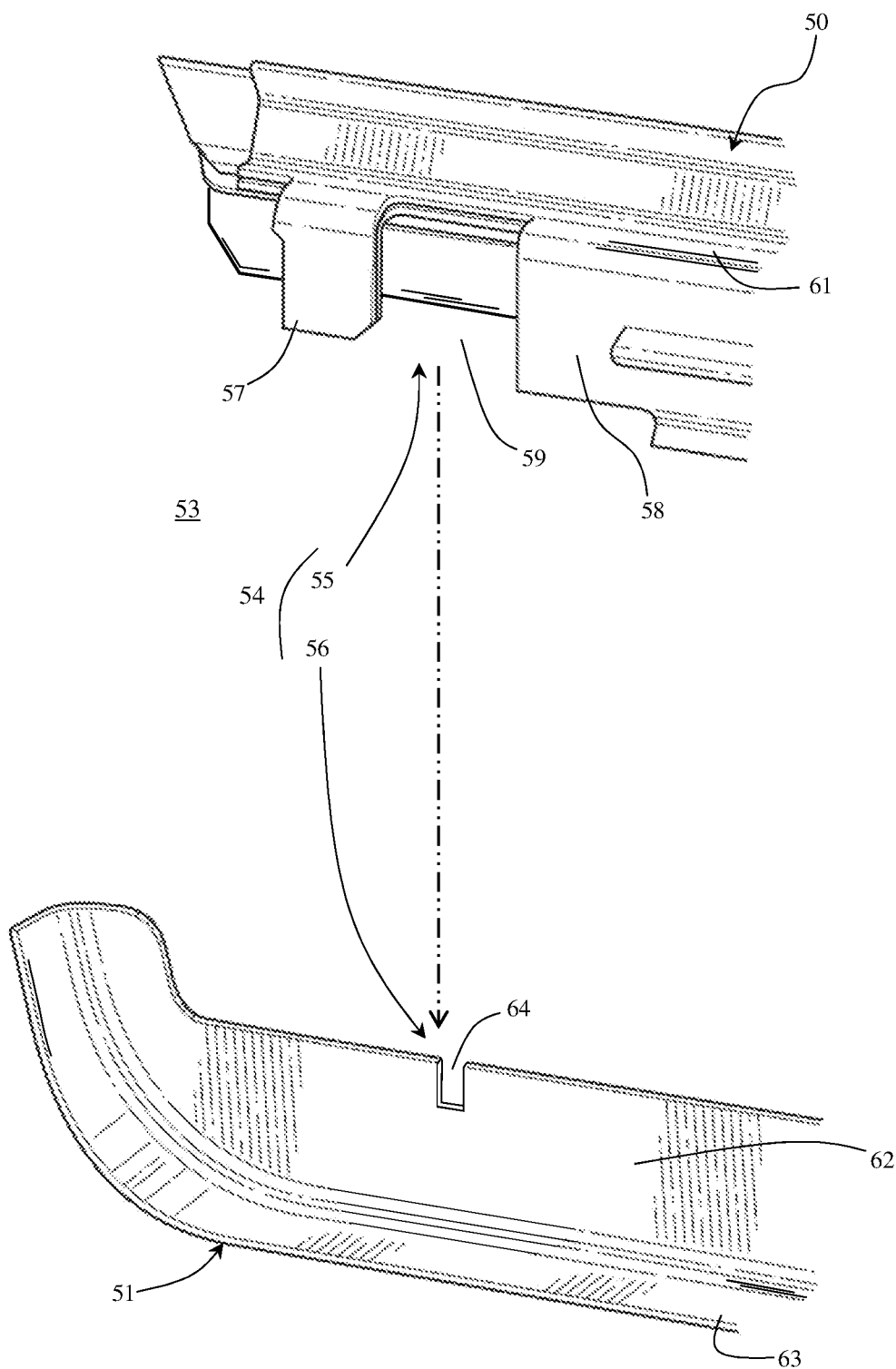
FIG. 14 is an exploded perspective view showing an inner weatherstrip and a door flange, constituting an assembly, and respective datum formations that collectively constitute a connection assembly, in accordance with one or more embodiments of the disclosure.

FIG. 14 is an exploded perspective view showing an inner weatherstrip 50 and a door flange 51, constituting an assembly 53. The assembly 53 can include weatherstrip datum formation 55 and flange datum formation 56 that collectively constitute a connection assembly 54. Similar to the arrangement shown in FIG. 7, the inner weatherstrip 50 can include an end portion 57 and mid portion 58. The end portion 57 and mid portion 58 can be separated by a notch 59. The notch 59 can be on a cross member 61 of the inner weatherstrip 50.

As shown in FIG. 14, the door flange 51 can include a support wall 62 and a flange 63. The support wall 62 can include a notch 64.

Figure 15:
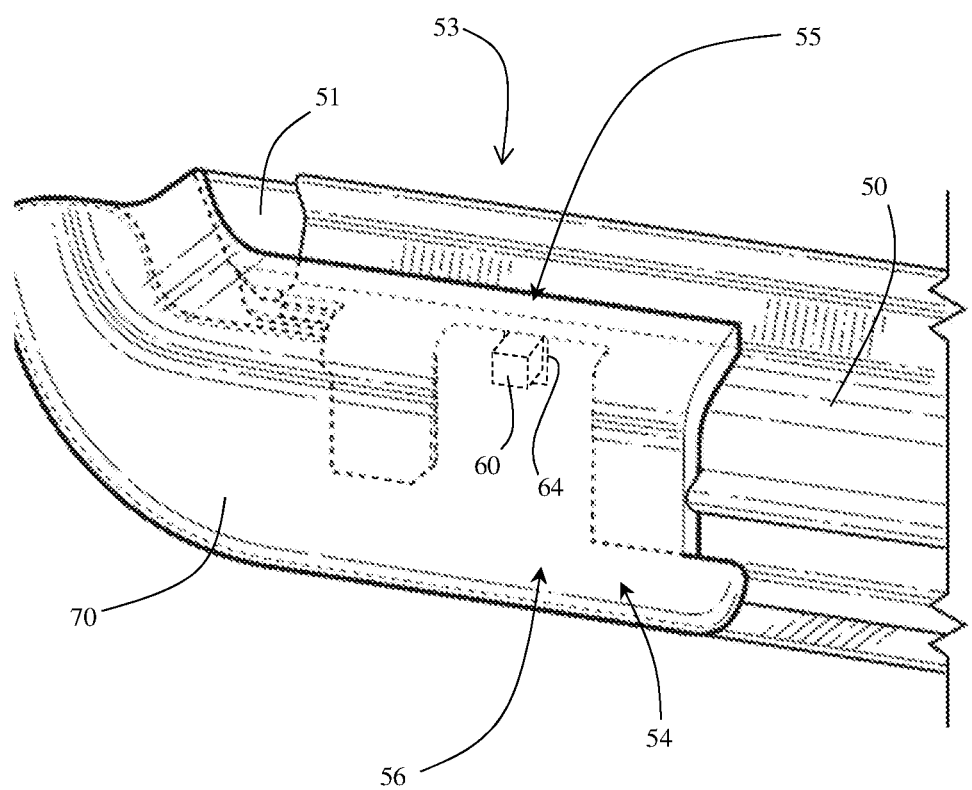
FIG. 15 is a perspective view showing an inner weatherstrip and a door flange, constituting an assembly, the same as or similar to that shown in FIG. 14, with an end cap, in accordance with one or more embodiments of the disclosure.

FIG. 15 is a perspective view showing the inner weatherstrip 50 and the door flange 51, constituting an assembly 53 in an assembled state, with an end cap 70. The end cap 70 is omitted from FIG. 14 for clarity and simplicity of the drawings. FIG. 15 shows weatherstrip datum formation 55 engaged with flange datum formation 56. The end cap 70 may be constituted by a piece of molded material that is dimensioned and shaped so as to cover the assembly 53. Specifically, the end cap 70 covers the weatherstrip datum formation 55 and the flange datum formation 56. The weatherstrip datum formation 55 can include a tab 60 projecting from an inner surface of the end cap 70. The tab 60 can extend into the notch 59. The tab 60 can be constituted by a molded tab, a ridge, a knob or protuberance. The tab 60 on the inner weatherstrip 50 can engage with the notch 64 so as to position the inner weatherstrip 50 on the door flange 51. FIG. 15 exaggerates the size of the notch 64 with respect to the size of the tab 60 for clarity of the view. it is to be understood that the tolerance between the notch 64 and the gap 60 can be set to an appropriate value such that the inner weatherstrip 50 can be accurately positioned on the door flange 51. As a result of the accurate positioning of the inner weatherstrip 50, an effective seal may be provided by the inner weatherstrip 50, in particular at ends of the inner weatherstrip 50 that fit with corners of the window in which the inner weatherstrip 50 is positioned. The end cap 70 may be complementary to, mate with, or engage other structure of the weatherstrip 50, the door flange 51, or other structure as desired or appropriate.

While certain embodiments of the invention are described above, and FIGS. 1-9 disclose a best mode for practicing the various inventive aspects, it should be understood that the invention can be embodied and configured in many different ways without departing from the spirit and scope of the invention.

For example, the exemplary embodiments of FIGS. 1-15 include a single pair of mating datum formations (i.e., the connection assembly 801, 2801, 54) that is located at one end of the exemplary inner weatherstrip. However alternate embodiments can include a connection assembly 801, 2801 located at any appropriate portion of the inner weatherstrip 500, 2500, 50.

It is appreciated that the various components of embodiments of the disclosure can be made from any of a variety of materials including, for example, metal, plastic, plastic resin, nylon, composite material, leather, and/or rubber, for example, or any other material as may be desired.

A variety of production techniques can be used to make the apparatuses as described herein. For example, suitable casting and/or injection molding and other molding techniques and other manufacturing techniques might be utilized. Also, the various components of the apparatuses can be integrally formed, as may be desired, in particular when using casting or molding construction techniques.

What is claimed is:

1. An assembly for use in a vehicle door, the assembly comprising:
    a weatherstrip that includes a mounting member that extends along a length axis of the weatherstrip, the mounting member including a side wall that extends along the length axis,
    the side wall includes a weatherstrip datum formation;
    an end cap covering the weatherstrip datum formation and a portion of the side wall that is adjacent to the mounting member; and
    a door flange that is configured to integrate with an inner door panel, the door flange includes a flange datum formation,
    the weatherstrip datum formation engages the flange datum formation so as to position the weatherstrip relative to the door flange, and
    the end cap covers the flange datum formation and engages the door flange.

2. The assembly of claim 1, wherein the weatherstrip datum formation includes a notch provided in the side wall.

3. The assembly of claim 2, wherein the mounting member further includes a cross wall that runs along the length axis of the weatherstrip in parallel to and connected, along the length axis, to an upper edge of the side wall; and
    the side wall includes:
        a mid portion that includes a side edge, and
        an end portion that includes a side edge, and
        the notch defined, at least in part, by the side edge of the mid portion and the side edge of the end portion, and
        the notch for receiving a portion of the flange datum formation.

4. The assembly of claim 3, wherein the notch extends through the side wall and into the cross wall, such that the cross wall includes a cutout that defines a portion of the notch, and
    the cross wall extends in an anteroposterior horizontal plane along the length axis, and
    the side wall extends in a vertical anteroposterior plane along the length axis.

5. The assembly of claim 2, wherein the side wall includes:
    a mid portion that includes a side edge, and
    an end portion that includes a side edge, and
    the notch defined, at least in part, by the side edge of the mid portion and the side edge of the end portion, and
    the notch for receiving a portion of the flange datum formation.

6. The assembly of claim 5, wherein the side edge of the mid portion and the side edge of the end portion are parallel to each other, and
    the side edge of the mid portion and the side edge of the end portion each extend perpendicular to the length axis of the weatherstrip.

7. The assembly of claim 6, wherein the side edge of the mid portion and the side edge of the end portion define the notch so as to slidably receive the flange datum formation therein.

8. The assembly of claim 5, wherein the end portion forms a tab adjacent to an end of the weatherstrip.

9. The assembly of claim 5, wherein
    the notch is open at a lower portion thereof; and
    the end portion includes a bevel that is at an angle to the side edge of the end portion, and the bevel is configured to guide the flange datum formation into the notch in assembly of the weatherstrip to the door flange.

10. The assembly of claim 2, wherein the side wall extends along the length axis of the weatherstrip and is configured to be supported by the door flange; and
    the flange datum formation includes a guide protuberance that is configured to be received into the notch of the side wall.

11. The assembly of claim 10, wherein the guide protuberance is constituted by a bridge segment of material that extends between a first portion of the door flange and a second portion of the door flange, and the bridge segment of material is arcuate in shape and possessing uniform geometry, along a width thereof, along the length axis.

12. The assembly of claim 11, wherein the door flange includes a support wall having a dominate surface; and
    the flange datum formation further includes a raised frame, on the support wall, that surrounds the guide protuberance, and
    the raised frame provides a raised surface, which is raised from the dominate surface of the support wall, to engage with the side wall.

13. The assembly of claim 2, wherein the mounting member further includes a cross wall that extends along the length axis of the weatherstrip in parallel to and connected, along the length axis, to an upper edge of the side wall;
    the side wall is an inner side wall configured to be disposed on an inboard side of the cross wall; and
    the door flange configured to integrate with the inner door panel is constituted by:
        (a) the door flange being a part of the inner door panel; or
        (b) the door flange being a separate piece, connected to the inner door panel.

14. The assembly of claim 2, wherein the side wall of the weatherstrip extends along the length axis of the weatherstrip and is configured to be supported by the door flange, the side wall terminates at an edge;

the notch extends from the edge such that the notch includes an opened end;

the door flange includes a support wall that supports the side wall of the weatherstrip and terminates at a free end, the door flange includes an opening through the side wall and spaced away from the free end of the door flange; and the flange datum formation includes a bridge segment that spans the opening and extends away from the opening such that a portion of the bridge segment is spaced away from the support wall and extends into the notch.

15. The assembly of claim 1, wherein the end cap terminates at a first end and at a second end that is spaced away from the first end along the length axis, the first end engages the weatherstrip, and the second end engages the door flange.

16. The assembly of claim 1, wherein the weatherstrip datum formation includes a tab, the tab defined by a first notch and a second notch disposed in the side wall; and the door flange includes a support wall, the flange datum formation provided on the support wall, and the flange datum formation includes a raised profile portion that extends from the support wall, and the raised profile portion includes a receiving opening formed therein; and wherein the receiving opening is configured to receive the tab.

17. The assembly of claim 16 wherein:

a first portion of the raised profile portion extends out from the support wall in varying profile depth, in a bulbous manner, along a first periphery of the raised profile portion;

a second portion of the raised profile portion extends out from the support wall in varying profile depth, in a bulbous manner, along a second periphery of the raised profile portion; and the receiving opening is provided between the first portion and the second portion.

18. The assembly of claim 16, wherein the tab includes opposing side edges, including a first side edge and a second side edge, to be received into the receiving opening, and the tab further includes:

a first beveled edge adjacent to and beveled with respect to the first side edge; and a second beveled edge adjacent to and beveled with respect to the second side edge.

19. A door assembly for a vehicle comprising:

an outer door panel;

an inner door panel connected to the outer door panel, the inner door panel includes a flange, the flange includes a flange datum formation, and the flange datum formation has a first shape;

a cavity extending from the inner door panel to the outer door panel;

an opening extending from the outer door panel to the inner door panel and in communication with the cavity, the flange of the inner door panel extends along the opening;

a windowpane housed in the cavity and movable between an opened position where the windowpane is retracted through the opening and into the cavity and a closed position where the windowpane is extended through the opening and out of the cavity, the windowpane includes an inner surface that moves into and out of the cavity as the windowpane moves between the opened position and the closed position;

a weatherstrip connected to the flange of the inner door panel, and the weatherstrip includes:

a mounting member that is connected to and extends along the flange of the inner door panel;

at least one flange seal that extends from the mounting member to the surface of the inner surface of the windowpane, and engages the inner surface of the windowpane to form a seal between the inner surface of the windowpane and the opening; and a weatherstrip datum formation that has a second shape that is complementary to the first shape to the flange datum formation, the weather strip datum formation engages the flange datum formation such that the weatherstrip datum formation and the flange datum formation together locate the weatherstrip at a predetermined position on the flange; and an end cap covering the weatherstrip datum formation, the door flange datum formation, and a portion of the mounting member, and the end cap engages the flange of the inner door panel.

20. An assembly for use in a vehicle door, the assembly comprising:

a weatherstrip that includes a mounting member that extends along a length axis of the weatherstrip, the mounting member including a side wall that extends along the length axis, and the side wall includes a weatherstrip datum formation; and a door flange that is configured to integrate with an inner door panel, the door flange includes a flange datum formation; and an end cap engaging the weatherstrip and the door flange; and the weatherstrip datum formation engages the flange datum formation so as to position the weatherstrip relative to the door flange; and wherein the weatherstrip datum formation includes a tab; and wherein the door flange includes a support wall, the flange datum formation is provided on the support wall, and the flange datum formation includes a receiving opening; and wherein the receiving opening is configured to receive the tab; and wherein the end cap covers the tab, the receiving opening, a portion of the side wall that is adjacent to the tab, and a portion of the side wall of the door flange that is spaced away from the portion of the side wall adjacent to the tab along the length axis.

* * * * *